(No Model.)

A. R. GEOFFROY.
NAME PLATE FOR BICYCLES, &c.

No. 573,870. Patented Dec. 29, 1896.

Witnesses
Geo. Wadman
Henry S. Read

Inventor
Arthur R. Geoffroy
By
James A. Whitney
Attorney

UNITED STATES PATENT OFFICE.

ARTHUR R. GEOFFROY, OF NEW YORK, N. Y.

NAME-PLATE FOR BICYCLES, &c.

SPECIFICATION forming part of Letters Patent No. 573,870, dated December 29, 1896.

Application filed May 9, 1896. Serial No. 590,816. (No model.)

*To all whom it may concern:*

Be it known that I, ARTHUR R. GEOFFROY, a citizen of the United States, and a resident of the city, county, and State of New York, have invented a new and useful Improvement in Name-Plates for Bicycles, &c; and I do hereby declare that the following is a full, clear, and exact description of the same, reference being had to the accompanying drawings, making a part of this specification, in which—

Figure 1:
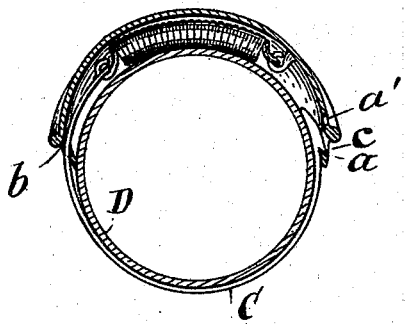
Figure 2:
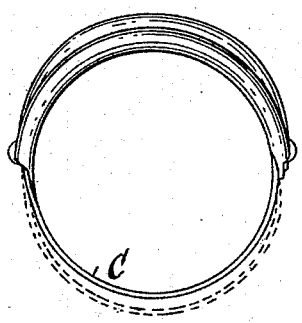
Figure 3:
Figure 4:
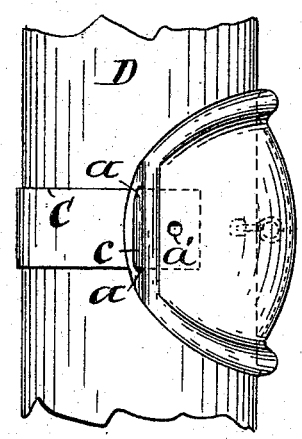

Figure 1 is a transverse sectional view of a device made according to my invention. Fig. 2 is an end view of the same. Fig. 3 is a front, and Fig. 4 a side, view of the same.

The object of this invention is to provide a name-plate for use on bicycles and other articles which may be readily attached to or detached from any suitable cylindrical or practically cylindrical support, as, for example, the standard of a bicycle, and which will automatically adjust itself to standards or supports of different diameters.

My invention comprises a novel combination of parts whereby a cheap, simple, strong, and convenient apparatus for the purpose indicated is provided and the above-mentioned objects thereby effectually secured.

A is a plate, curved in its cross-section, as shown in Fig 1, of any desired size and circumferential contour and with its outer surface adapted to receive a name or other suitable inscription. In one end of this plate is provided a slot $a$ and at the other a slot $b$. Within the concave inner surface of this plate and in a transverse position is a spiral spring B. One end of this spring is fast to the plate. The other or free end is fast to the end of a sliding curved or semicircular yoke C, which has some degree of flexibility or elasticity and which may be formed of a thin metallic strip or ribbon. This yoke is passed through the slot $a$ of the plate so as to be longitudinally movable therethrough, being drawn inward to any requisite degree by the spring B and capable of being on occasion drawn outward against the resistance of said spring. The opposite end of the yoke is provided with a catch whereby it may be made fast at the opposite end of the plate. As shown in the drawings, this fastening device comprises a shoulder $c$ on the free extremity of the yoke arranged to project into the slot $b$ and to catch upon an edge thereof when the end of the yoke is brought into suitable relation thereto. To detach this extremity of the yoke from the plate, any suitable thrusting device, as, for example, the point of a small awl, may be thrust through a suitably-provided orifice $a'$, formed on the plate and thus applied to push the shoulder $c$ from its hold upon the edge of the slot $b$. Any other suitable fastening device may, however, be employed for connecting the free end of the bow with the end of the plate without departing from my invention.

By disconnecting the free end $a'$ of the yoke from the plate the yoke may be readily passed around any suitable support D (which may, when desired, comprise simply the standard of a bicycle) and its said free end again made fast to the end of the plate. The curved inner surface of the plate is thus brought opposite the concavity presented by the curvature of the yoke, the latter by reason of its somewhat elastic or flexible character conforming to the contiguous surface of the support, while by the tension of the spring it is practically shortened or elongated, as the case may be, to automatically adjust it to any contact with the surface of the support, the spring retracting the yoke to the requisite extent when the diameter of the support is comparatively small and yielding to permit the yoke to be drawn outward through the slot $a$ to increase its available size when the diameter of the support is comparatively great, the spring at all times drawing the yoke, and consequently the curved inner surface of the plate, into snug contact with the support, thereby causing the device to simply embrace the latter and to be held firmly in place and position thereon at the same time that provision exists for conveniently detaching the device when desired and for attaching it to another suitable support of a different diameter.

What I claim as my invention is—

The combination with a curved plate adapted to receive on its outer surface a name or inscription, and having a slot, $a$, of a curved and somewhat flexible or elastic yoke which is passed through said slot, a spiral spring placed within the concavity of the plate with one end attached thereto and with its opposite end connected with the inner end of the yoke, and a fastening device for connecting and disconnecting the free end of the yoke to and from the opposite end of the plate, all substantially as and for the purpose herein set forth.

ARTHUR R. GEOFFROY.

Witnesses:
Z. FREUND,
WM. BELKE.